United States Patent
Munroe et al.

(10) Patent No.: US 7,065,298 B1
(45) Date of Patent: Jun. 20, 2006

(54) CODE-BASED OPTICAL NETWORKS, METHODS, AND APPARATUS

(75) Inventors: Michael J. Munroe, Eugene, OR (US); Alan E. Johnson, Eugene, OR (US); Anders Grunnet-Jepsen, Eugene, OR (US); Eric S. Maniloff, Eugene, OR (US); Thomas W. Mossberg, Eugene, OR (US); John N. Sweetser, Eugene, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/454,164

(22) Filed: Nov. 17, 1999

Related U.S. Application Data

(60) Provisional application No. 60/108,701, filed on Nov. 17, 1998.

(51) Int. Cl.
*H04J 4/00* (2006.01)

(52) U.S. Cl. .............. 398/77; 398/78; 398/66; 398/67; 398/68; 398/69; 398/70; 398/71; 398/72; 398/87; 398/100; 398/183; 398/166; 398/167.5; 370/474; 370/476; 385/24; 385/37

(58) Field of Classification Search ............ 398/66, 398/67, 68, 70, 71, 72, 75, 77, 78, 82, 83, 398/84, 87, 98, 100, 166, 167.5, 183, 69; 370/474, 476, 392, 393; 385/24, 37
See application file for complete search history.

(56) References Cited

U.S. PATENT DOCUMENTS

| | | |
|---|---|---|
| 3,568,167 A | 3/1971 | Carson |
| 3,896,420 A | 7/1975 | Szabo |
| 3,922,061 A | 11/1975 | Glass et al. |
| 4,101,976 A | 7/1978 | Castro et al. |
| 4,158,890 A | 6/1979 | Burland |
| 4,329,059 A | 5/1982 | Pond et al. |
| 4,387,955 A | 6/1983 | Ludman et al. |
| 4,459,682 A | 7/1984 | Mossberg |
| 4,474,427 A | 10/1984 | Hill et al. |
| 4,533,211 A | 8/1985 | Bjorklund et al. |
| 4,655,547 A | 4/1987 | Heritage et al. |
| 4,670,854 A | 6/1987 | Mossberg et al. |
| 4,703,474 A | 10/1987 | Foschini et al. |
| 4,725,110 A | 2/1988 | Glenn et al. |

(Continued)

FOREIGN PATENT DOCUMENTS

EP  0 100 418  2/1984

(Continued)

*Primary Examiner*—Hanh Phan
(74) *Attorney, Agent, or Firm*—Blakely, Sokoloff, Taylor & Zafman LLP

(57) ABSTRACT

Optical communication systems include a central station that encodes data transmitted to multiplexing (mux) stations or user stations. The central station also decodes data received from the mux stations or user stations. Encoding and decoding are performed using codes, such as composite codes, that designate sources and destinations for data. The mux stations, user stations, and the central station have address encoders and decoders that use, for example, fiber Bragg gratings to encode or decode optical signals according to a code such as a composite code derived by combining codes from one or more sets of codes. A passive optical network comprises one or more levels of mux stations that use such address decoders and encoders to receive, decode, and encode data for transmission toward a central station or a user station.

9 Claims, 5 Drawing Sheets

U.S. PATENT DOCUMENTS

| | | | | |
|---|---|---|---|---|
| 4,779,266 A | * | 10/1988 | Chung et al. | 370/93 |
| 4,809,362 A | | 2/1989 | Claus et al. | |
| 4,866,699 A | | 9/1989 | Brackett et al. | |
| 4,867,522 A | | 9/1989 | Cassidy | |
| 4,941,733 A | | 7/1990 | Leib | |
| 4,989,199 A | | 1/1991 | Rzeszewski | |
| 5,073,980 A | | 12/1991 | Prucnal et al. | |
| 5,132,824 A | | 7/1992 | Patel et al. | |
| 5,136,666 A | | 8/1992 | Anderson et al. | |
| 5,166,818 A | | 11/1992 | Chase et al. | |
| 5,239,548 A | | 8/1993 | Babbitt et al. | |
| 5,276,637 A | | 1/1994 | Mossberg | |
| 5,315,423 A | | 5/1994 | Hong | |
| 5,337,382 A | | 8/1994 | Mizrahi | |
| 5,351,147 A | | 9/1994 | Frenkel | |
| 5,367,588 A | | 11/1994 | Hill et al. | |
| 5,377,288 A | | 12/1994 | Kashyap et al. | |
| 5,383,179 A | * | 1/1995 | Saini et al. | 370/393 |
| 5,388,173 A | | 2/1995 | Glenn | |
| 5,467,212 A | * | 11/1995 | Huber | 359/168 |
| 5,519,526 A | * | 5/1996 | Chua et al. | 359/152 |
| 5,568,301 A | | 10/1996 | Tiemann et al. | |
| 5,600,466 A | | 2/1997 | Tsushima et al. | |
| 5,668,901 A | | 9/1997 | Keck et al. | |
| 5,701,186 A | * | 12/1997 | Huber | 398/72 |
| 5,712,932 A | | 1/1998 | Alexander et al. | |
| 5,718,738 A | | 2/1998 | Kohnke et al. | |
| 5,726,785 A | | 3/1998 | Chawki et al. | |
| 5,729,548 A | | 3/1998 | Holender | |
| 5,737,106 A | | 4/1998 | Sansonetti et al. | |
| 5,742,416 A | | 4/1998 | Mizrahi | |
| 5,748,350 A | | 5/1998 | Pan et al. | |
| 5,748,814 A | | 5/1998 | Painchaud et al. | |
| 5,760,941 A | | 6/1998 | Young et al. | |
| 5,761,351 A | | 6/1998 | Johnson | |
| 5,764,829 A | | 6/1998 | Judkins et al. | |
| 5,784,506 A | | 7/1998 | Pfeiffer | |
| 5,790,287 A | * | 8/1998 | Darcie et al. | 359/110 |
| 5,793,907 A | | 8/1998 | Jalali et al. | |
| 5,796,502 A | | 8/1998 | Haller, Jr. | |
| 5,805,583 A | * | 9/1998 | Rakib | 370/342 |
| 5,808,764 A | * | 9/1998 | Frigo et al. | 359/127 |
| 5,812,318 A | | 9/1998 | Babbitt et al. | |
| 5,825,520 A | * | 10/1998 | Huber | 359/130 |
| 5,841,776 A | * | 11/1998 | Chen | 370/441 |
| 5,850,189 A | * | 12/1998 | Sakanaka et al. | 340/825.72 |
| 5,859,716 A | * | 1/1999 | O'Sullivan et al. | 359/110 |
| 5,886,539 A | * | 3/1999 | Bell | 326/82 |
| 5,907,421 A | | 5/1999 | Warren et al. | |
| 6,292,282 B1 | * | 9/2001 | Mossberg et al. | 359/123 |
| 6,313,771 B1 | * | 11/2001 | Munroe et al. | 341/137 |
| 6,314,220 B1 | * | 11/2001 | Mossberg et al. | 385/37 |
| 6,381,053 B1 | * | 4/2002 | Fathallah et al. | 359/136 |
| 6,404,956 B1 | * | 6/2002 | Brennan, III et al. | 385/37 |
| 6,765,908 B1 | * | 7/2004 | Chen | 370/392 |

FOREIGN PATENT DOCUMENTS

| | | |
|---|---|---|
| EP | 0 231 629 | 12/1987 |
| GB | 2 178 262 A | 4/1987 |
| GB | 2 189 038 A | 10/1987 |
| JP | 1-282931 | 11/1989 |
| JP | 6-350566 | 12/1994 |
| JP | 7-007523 | 1/1995 |
| WO | WO 98/23057 | 5/1998 |

* cited by examiner

CODE-BASED OPTICAL NETWORKS, METHODS, AND APPARATUS

This application claims the benefit of U.S. Provisional Application No. 60/108,701, filed Nov. 17, 1998.

FIELD OF THE INVENTION

The invention pertains to optical communication systems.

BACKGROUND OF THE INVENTION

Optical fibers provide communication bandwidths as large as tens of Terahertz (THz). Such large bandwidths are too large to be fully used by single-channel communication systems that transmit data by amplitude modulation of a narrow-bandwidth optical carrier such as by directly modulating a distributed feedback laser. Factors limiting the bandwidth occupied by simple amplitude-modulated systems include bandwidth limits on available electronic and optical components such as optical modulators and detectors, as well as fiber dispersion.

In order to more fully use the available bandwidth of an optical fiber, multiplexing techniques have been developed that permit several communication channels to use the same optical fiber. The total fiber bandwidth used by these channels can be as large as the sum of the individual channel bandwidths. Conventional methods for multiplexing in optical communication systems include time-division multiplexing (TDM), wavelength-division multiplexing (WDM), and optical-code-division multiple access (OCDMA). These optical multiplexing methods are typically used in long haul, point-to-point communication and in short haul, ring-topology communication systems. Each of these methods has benefits as well as drawbacks associated with it.

A passive optical network (PON) capable of transmitting and receiving data from a large number of users simultaneously reduces cost and increases system reliability. A PON includes passive optical components that route optically encoded data streams to and from designated users or network nodes. Communication systems based on the Synchronous Optical Network ("SONET") are not PONs since each user or node in a SONET system must have active equipment to detect and demultiplex the data stream to recover data, and then retransmit data to the next user or node.

WDM systems are PONs, but each user of a WDM system is assigned a specific wavelength, so that WDM-based PONs are expensive and are not readily reconfigurable.

The use of OCDMA in a PON is advantageous in that data encoded onto a single transmitter can be distributed among many users because data is distinguished by a complex temporal code, and not wavelength as in WDM systems. Furthermore, CDMA coding has the advantage that the number of users is flexible, dependent on system usage. Also, most OCDMA implementations inherently offer hardware encryption by making channel decoding difficult without knowledge of the OCDMA encoding scheme. However, flexible tree-architecture PONs based on OCDMA typically require expensive equipment that must be located at each network node or an end-user location. Therefore, improved systems, methods, and architectures are needed for practical PON OCDMA systems.

DETAILED DESCRIPTION

Figure 1:
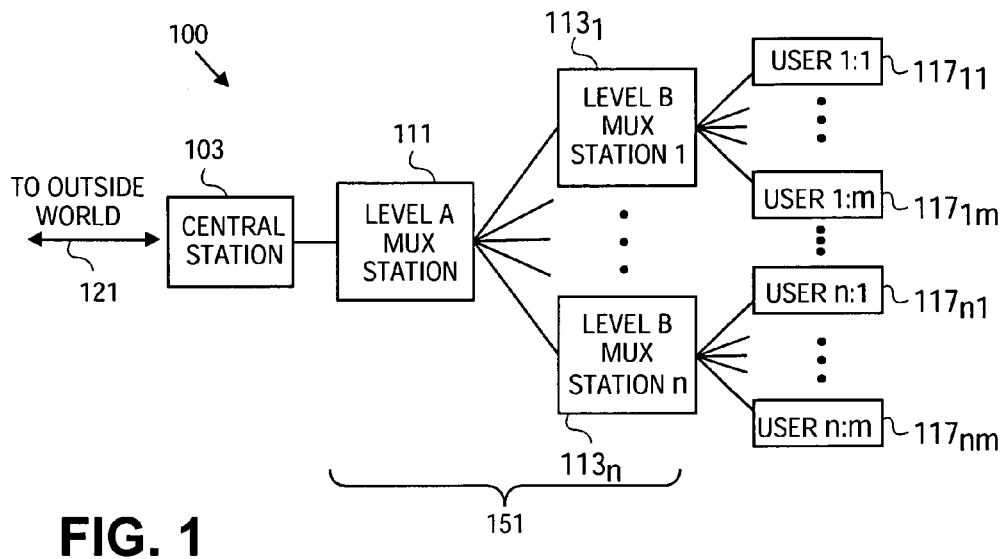
FIG. 1 is a schematic block diagram of a communication system that includes a passive optical network (PON).

FIG. 1 illustrates an optical communication system 100 comprising a central station 103 that distributes optically transmitted data (telephony, internet, video, etc.) to a number of geographically separated users $117_{11}, \ldots, 117_{nm}$ that communicate with the central station 103 via a passive optical network 151. In addition, the central station 103 collects data from the user stations $117_{11}, \ldots, 117_{nm}$ for remote transmission via an optical communication link 121. For convenience in describing the communication system 100 and other communication systems and apparatus, a "downstream direction" is defined as a data-propagation direction from a central station to a user. An "upstream direction" is a data-propagation direction from a user to a central station.

In the communication system 100, multiple data streams are multiplexed and demultiplexed by using optical-code-division multiple access (OCDMA). As shown in FIG. 1, the communication system 100 has a tree architecture with a level-A mux station 111 and level-B mux stations $113_1, \ldots, 113_n$. While FIG. 1 shows the level-A mux station 111 as a single branch from the central station 103, the central station 103 can communicate with multiple level-A mux stations.

Figure 2:
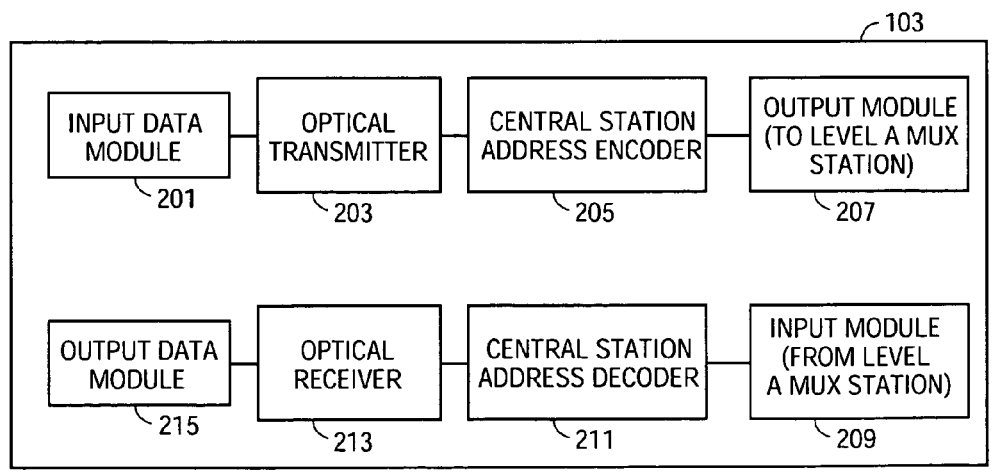
FIG. 2 is a schematic block diagram of the central station of FIG. 1.

FIG. 2 is a schematic diagram of the central station 103. The central station 103 comprises an input data module 201 that receives data transmitted to or produced at the central station 103. As shown in FIG. 1, the central station 103 receives data from an external data link 121 or from the level-A mux station 111. Returning to FIG. 2, the input-data module 201 delivers an electrical data signal to an optical transmitter 203 that includes an optical emitter such as a distributed feedback laser. The laser is modulated in response to the electrical data signal so as to produce an optical data signal. Alternatively, an emitter can be provided that emits a continuous optical signal or a periodic series of optical pulses that are modulated with an electro-optic, acousto-optic, electro-absorptive, or other modulator. The modulation can be amplitude-modulation or phase-modulation or a combination thereof.

A central station address encoder 205 receives the optical data signal from the optical transmitter 203 and encodes the modulated optical signal with an optical code such as a composite code serving as an address for a selected user. In an alternative embodiment, the central station address encoder 205 can include encoders for every user (a total of nxm encoders), or a smaller number of programmable encoders depending on system requirements, e.g., the aggregate downstream bandwidth and the number of users to be simultaneously addressed.

Composite codes are described in a U.S. patent application entitled CODES, METHODS, AND APPARATUS FOR OPTICAL ENCODING AND DECODING, co-filed with the present application and incorporated herein by reference. Representative encoders and decoders using fiber Bragg gratings are described in U.S. patent application Ser. No. 09/354,851, TIME-WAVELENGTH MULTIPLE ACCESS COMMUNICATION SYSTEM that is incorporated herein by reference.

The composite codes are made of one or more code sets, each code set corresponding to the number of mux levels. In the two-node (two mux levels) network of FIG. 1, the central station address encoder 205 applies composite codes having two levels A, B corresponding to level-A codes and level-B codes. If a third group of nodes were provided (i.e., if a level-C mux station were placed between the level-B mux stations $113_1, \ldots, 113_n$ and user stations $117_{11}, \ldots, 117_{nm}$ to provide a third level of coding), then the central station address encoder 205 could apply the level-C codes. In such a case, the composite codes would include A-level, B-level, and C-level codes. Composite-code encoders can be configured in a variety of ways as described in the references cited above.

Returning further to FIG. 2, an output module 207 of the central station 103 delivers combined optically coded (composite-coded) data signals from the encoders of the central station address encoder 205, and delivers a coded optical signal to the level-A mux station 111. The coded signal delivered to the level-A mux station 111 is encoded with level-A and level-B codes that designate a user station to which data is to be delivered.

The central station 103 further comprises an input module 209 that receives optical signals from the level-A mux station 111 and delivers optical signals to a central station address decoder 211 that decodes the level A and level B codes with which the optical signals are encoded. After the optical signals are thus decoded, an optical receiver 213 produces an uncoded electrical signal corresponding to the decoded optical signal, and an optical transmitter ("output data module") 215 transmits a corresponding optical signal on the communication link 121.

Figure 3:
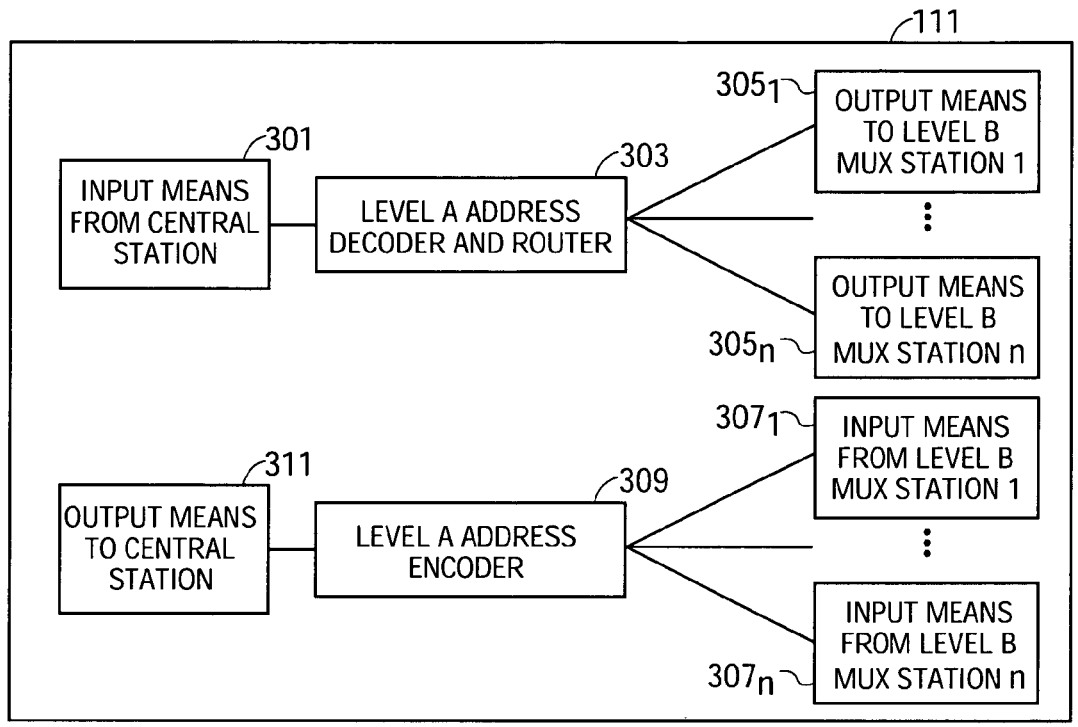
FIG. 3 is a schematic block diagram of a representative level-A multiplexing (mux) station.

FIG. 3 is a schematic diagram of the level-A mux station 111. An input module ("input means") 301 of the level-A mux station 111 accepts optical, composite-coded data signals from the central station 103. The input module 301 directs the optical data signals to a level-A address decoder/router 303. Output modules ("output means") $305_1, \ldots, 305_n$ receive optical data signals from the level-A address decoder/router 303, split the received optical data signal into n optical data signals, and transmit these signals to respective level-B mux stations $113_1, \ldots, 113_n$.

The level-A mux station 111 also includes input modules ("input means") $307_1, \ldots, 307_n$ that receive optical data signals from respective level-B mux stations $113_1, \ldots, 113_n$. A level-A address encoder 309 applies a level-A code to the received optical signals and directs the encoded optical signals to an output module ("output means") 311 for delivery to the central station 103.

Figure 4:
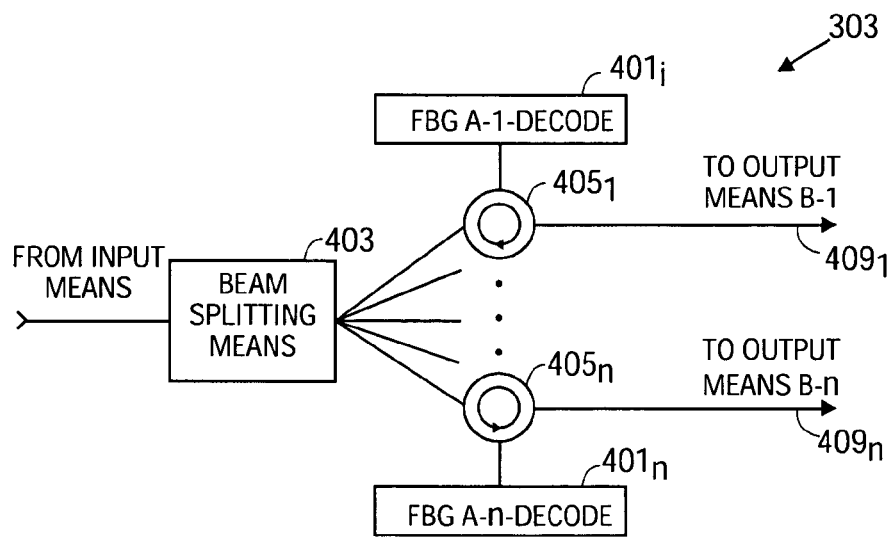
FIG. 4 is a schematic diagram of a level-A address encoder.

FIG. 4 is a schematic diagram of the level-A address decoder/router 303. A beam splitter ("beam splitting means") 403 or a fiber directional coupler receives optical signals from the input module 303 and directs portions of the optical signals to optical circulators $405_1, \ldots, 405_n$ that, in turn, direct respective portions of the optical signals to corresponding complex fiber Bragg gratings $401_i, \ldots, 401_n$ that decode level-B codes. Decoded optical signals are delivered to corresponding outputs $409_1, \ldots, 409_n$ that deliver a respective decoded optical signal to a corresponding level-B mux station. The optical signals for the respective level-B mux stations $113_1, \ldots, 113_n$ can be broadcast, and data not intended for delivery to a particular level-B mux station (and ultimately to a selected user station) is not properly decoded at the decoder/router 303. For data decoded with an unmatched decoder, the optical signal is typically a noise-like, low-power signal.

Figure 5:
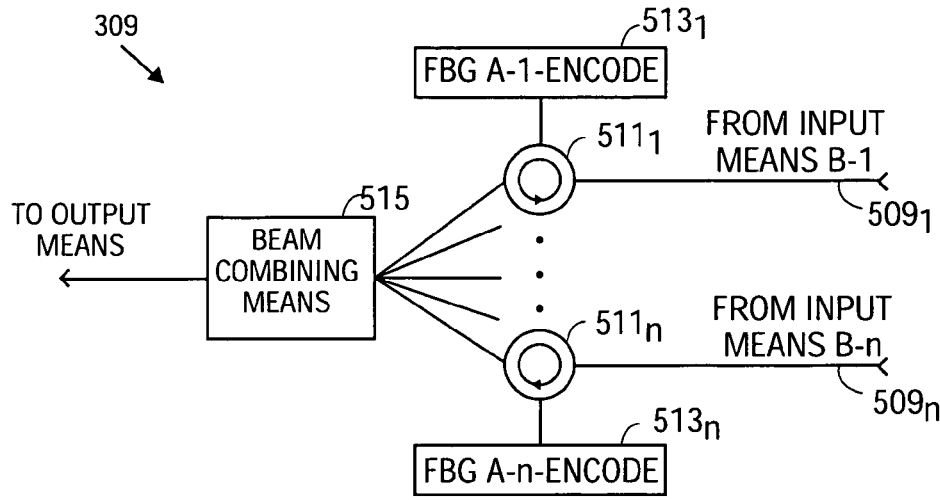
FIG. 5 is a schematic diagram of a level-A address decoder.

FIG. 5 is a schematic diagram of the level-A address encoder 309. Level-B coded optical signals are received at corresponding inputs $509_1, \ldots, 509_n$ and delivered to respective optical circulators $511_1, \ldots, 511_n$ and respective fiber Bragg gratings $513_1, \ldots, 513_n$. After encoding with level-A codes by the fiber Bragg gratings $513_1, \ldots, 513_n$, encoded optical signals are combined by a beam combiner ("beam combining means") 515 for delivery to the output module 311 and the central station 103.

Figure 6:
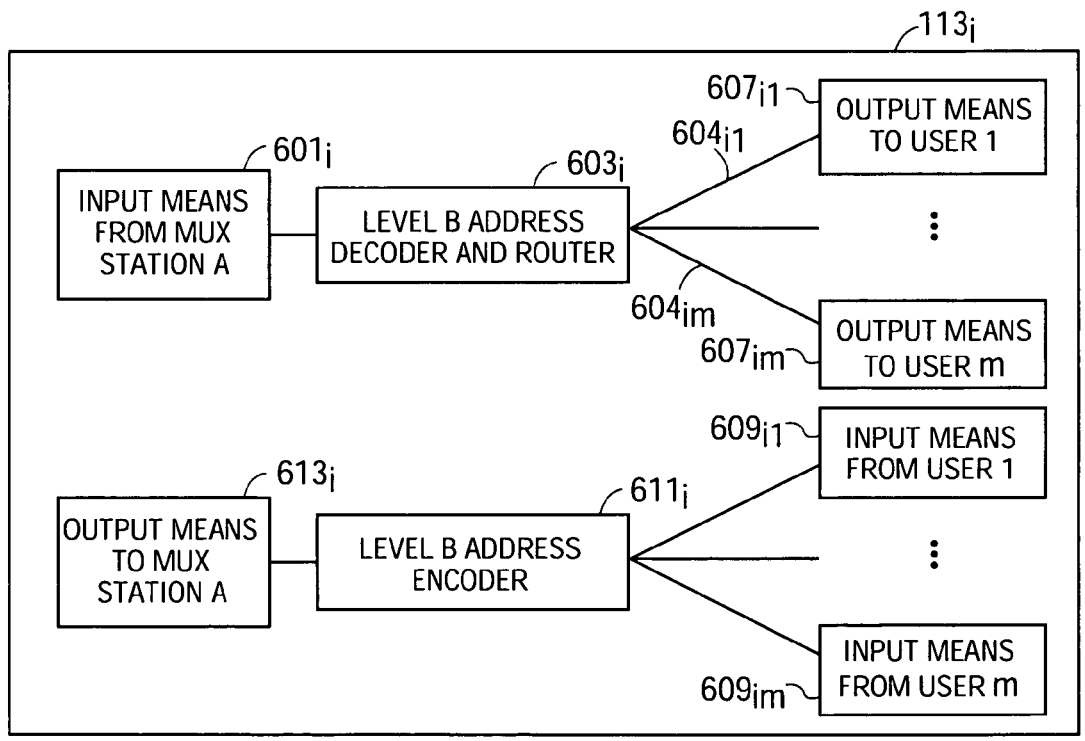
FIG. 6 is a schematic diagram of a representative level-B mux station.

FIG. 6 is a schematic diagram of a representative level-B mux station $113_i$. The level-B mux station $113_i$ includes an input module ("input means") $601_i$ that accepts an optically coded data signal from the level-A mux station 111. A level-B address decoder/router $603_i$ receives the optical data signal and splits the optical data signal into m corresponding optical data signals $604_{i1}, \ldots, 604_{im}$, corresponding to the m user stations $117_{i1}, \ldots, 117_{im}$. Output modules $607_{i1}, \ldots, 607_{im}$ transmit the split optical data signals $604_{i1}, \ldots, 604_{im}$.

Figure 7:
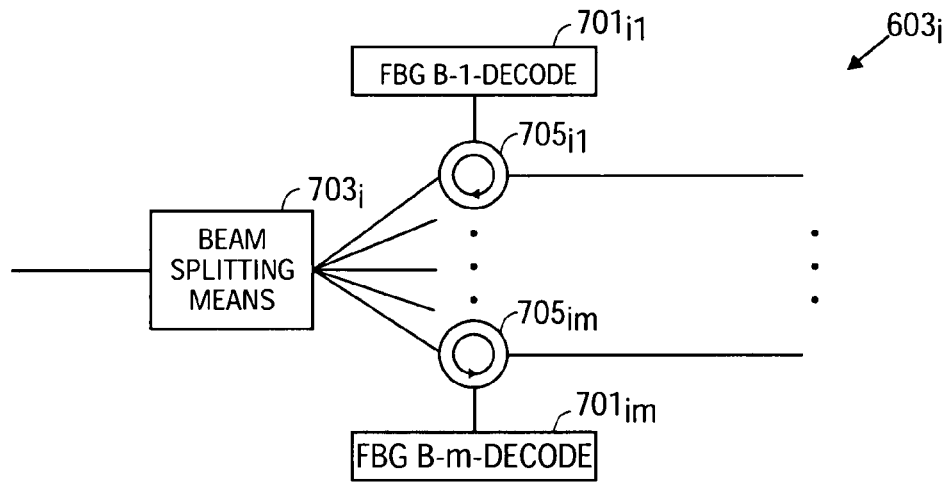
FIG. 7 is a schematic diagram of a level-B address decoder.

FIG. 7 is a schematic diagram of the representative level-B address decoder/router $603_i$. A beam splitter ("beam splitting means") $703_i$ or a fiber directional coupler receives an optical signal from the level-A mux station 111 and directs respective portions of the optical signal to optical circulators $705_{i1}, \ldots, 705_{im}$ that, in turn, direct the respective portions to corresponding fiber Bragg gratings $701_{i1}, \ldots, 701_{im}$ that decode level-B codes. The optical signal from the level-A mux station 111 can be broadcast to the respective level-B mux station because data not intended for delivery to a particular level-B mux station (and ultimately to a selected user station) is not properly decoded in the decoder/router $603_i$. For data decoded with an unmatched decoder, the optical signal is typically a noise-like, low-power signal and data is not readily recovered from such signals.

Figure 8:
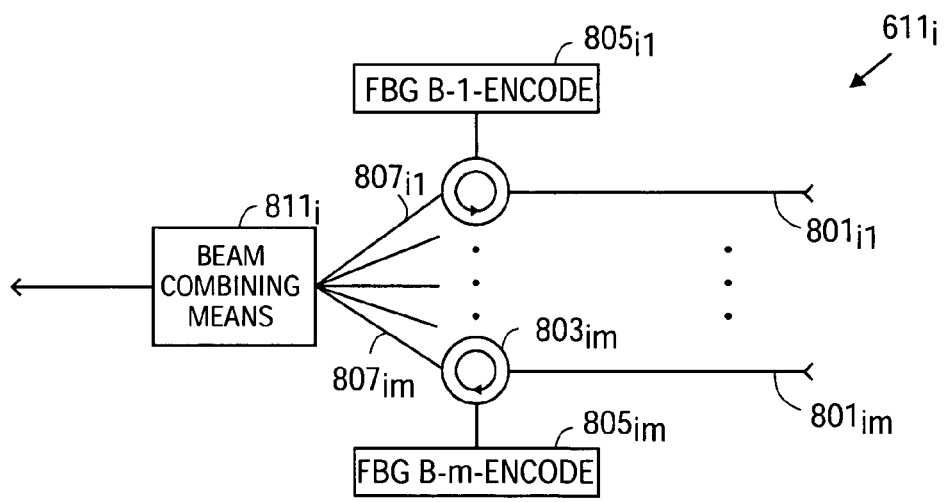
FIG. 8 is a schematic diagram of a level-B address encoder.

FIG. 8 is a schematic diagram of the level-B encoder $611_i$. Optical signals are received from user stations $117_{i1}, \ldots, 117_{im}$ at respective inputs $801_{i1}, \ldots, 801_{im}$ and delivered to respective optical circulators $803_{i1}, \ldots, 803_{im}$ and fiber Bragg gratings $805_{i1}, \ldots, 805_{im}$ that encode level-B codes. Encoded optical signals propagate along fiber lengths $807_{i1}, \ldots, 807_{im}$ to a beam combiner ("beam combining means") $811_i$, and the combined optical signal is delivered to the level-A mux station 111.

Figure 9:
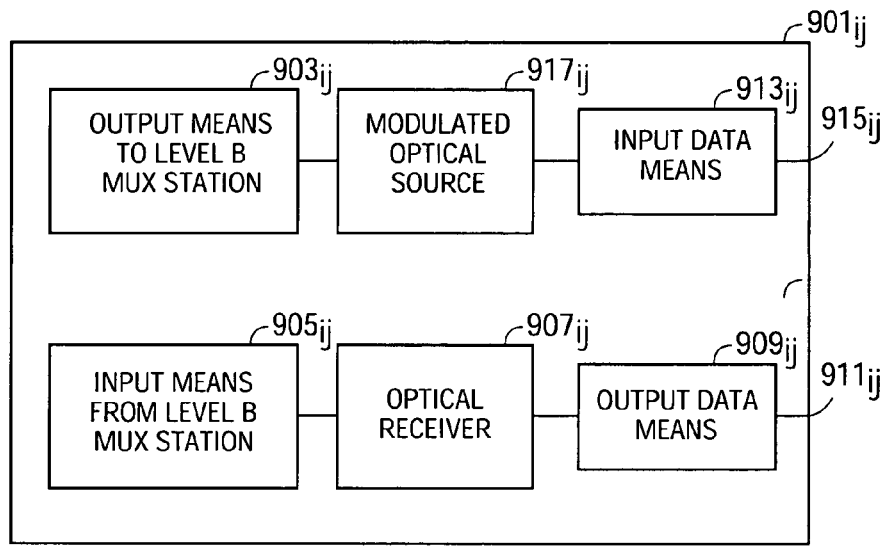
FIG. 9 is a schematic diagram of a representative user station of the communication system of FIG. 1.

The user stations $117_{i1}, \ldots, 117_{nm}$ include respective interface modules, such as a representative interface module $901_{ij}$ shown in FIG. 9. The interface module $901_{ij}$ comprises an output module ("output means") $903_{ij}$ and an input module ("input means") $905_{ij}$ that send data to and receive data from a corresponding level-B mux station $113_i$. The input module $905_{ij}$ receives a decoded optical signal from the corresponding decoder of the level-B mux station $113_i$. An optical receiver $907_{ij}$ converts the decoded optical signal into a corresponding electrical signal. If the decoded optical signal originated at the central station 103 and was encoded with the level-A and level-B codes associated with the selected user station $117_{ij}$, then the electrical signal includes a series of data pulses. If the level-A and level-B codes applied at the central station 103 have not been properly decoded, then the electrical signal is a noise-like signal that can include some electrical pulses similar to data pulses but having smaller magnitudes. The optical receiver $907_{ij}$ can include circuitry for removing or attenuating these smaller pulses and the noise-like background by thresholding and/or digitization, producing an enhanced electrical data output signal. The data output module delivers the electrical data output signal to a module output $911_{ij}$.

For communication in an upstream direction, i.e., from a user station $117_{ij}$ towards the central station 103, an input module $913_{ij}$ receives data from a user input $915_{ij}$. The received data modulates an optical transmitter ("modulated optical source") $917_{ij}$ and the output module $903_{ij}$ transmits an uncoded optical signal to a level-B mux. The optical transmitter $917_{ij}$ can include a laser diode that is directly modulated by the received data, or that is modulated by an electro-optic, acousto-optic, electro-absorptive, or other modulator. Corresponding level-A and level-B mux stations apply level-A and level-B codes to the uncoded optical signal, and the coded signal arrives at the central station 103 where it can be decoded for transmission by stripping the level-A and level-B codes that indicate the data source.

Returning to FIG. 1, the PON 151 includes coders (encoders and decoders, not shown) that apply and strip codes from optical data signals. These coders require no power, nor is an optical-to-electrical conversion needed in the PON 151. In some cases, partially encoded and decoded optical signals are broadcast, but data generally cannot be recovered from these broadcast optical signals unless decoded and encoded with matching codes. Hence, the PON 151 is "secure."

The embodiments described herein comprise encoders and decoders that include optical circulators and reflective complex fiber Bragg gratings. Other coding methods and apparatus can be used. Such methods and apparatus also apply selected linear spectral transforms to optical signals. Furthermore, other methods and apparatus, such as beam splitters or fiber couplers, can be used to separate counter-propagating optical data signals instead of optical circulators. Representative optical encoders and decoders include passive diffractive devices such as Bragg gratings and fiber Bragg gratings as described in, for example, U.S. Pat. No. 5,812,318; U.S. patent application Ser. No. 09/115,331, SEGMENTED TASM GRATINGS, Ser. No. 09/120,959, SEGMENTED COMPLEX FIBER GRATING, and Ser. No. 09/354,851, TIME WAVELENGTH MULTIPLE ACCESS COMMUNICATION SYSTEM. These documents are incorporated herein by reference.

The communication system 100 of FIG. 1 can include optical amplifiers if necessary, based on system-design parameters such as fiber loss, desired signal-to-noise level, intended number of users, acceptable bit-error rate, and others. Dispersion compensation can be provided in the PON 151 and a wavelength-division-multiplexed (WDM) layer can be provided in addition to the code layer. In addition, embodiments are discussed with reference to optical signals that are electromagnetic fields of wavelength from about 300 nm to 0.1 mm. However, embodiments using longer or shorter wavelength electromagnetic fields are possible and electrical voltages carried by conductors such as wires can be used as well.

For convenience in describing embodiments, decoders were referred to as "stripping" a code from a signal. Decoding generally permits data recovery by a detector, and decoding need not restore a signal exactly to its pre-encoded form. In addition, a signal from which a code has been stripped can be referred to as a "decoded" signal. Finally, for clarity, encoders and decoders are referred to in the above description, but can be more generally referred to as "coders."

Figure 10:
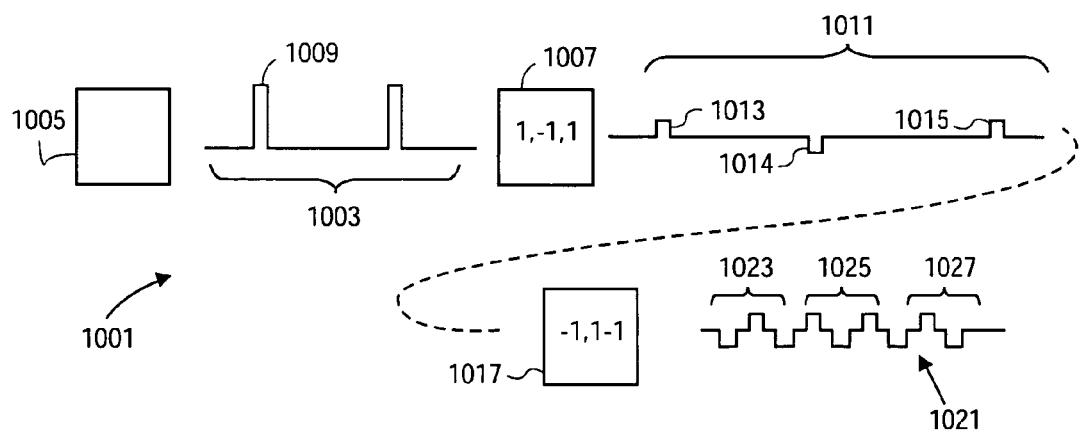
FIG. 10 is a schematic diagram of a data-transmission system using 3-chip supercodes and 3-chip subcodes.

For convenience, composite codes that include two code levels and suitable for use in a passive optical network and in address encoders/decoders are described with reference to FIG. 10. FIG. 10 is a schematic of a data transmission system 1001 that produces a data signal 1003 from a data source 1005. As shown in FIG. 10, the data signal 1003 is represented as a binary, on-off modulation of an electromagnetic carrier such as an optical carrier. The on-off modulation is selected for convenience only, and other modulations can include phase, amplitude, intensity, and frequency modulation. In addition, non-binary modulation having more than two modulation levels can be used.

A supercode encoder 1007 receives the data signal 1003 and applies a predetermined code $R_i$ selected from a code set R to the data signal 1003. For purposes of illustration, a code $R_i = \{1, -1, 1\}$ is selected and applied to a representative bit 1009 of the data signal 1003. As specified by the code R, the encoder 1007 receives the bit 1009 and transforms the bit into a "supercoded" bit packet 1011. The supercoded bit packet 1011 includes super-coded bits ("superbits") 1013–1015 that are relatively delayed by a delay time $T_{RC}$, wherein $T_{RC}$ is a supercode chip duration. In addition, the phase of the superbit 1014 is inverted, while the phases of the superbits 1013, 1015 are unchanged. The encoder 1007 applies the code $R_i$ to the entire data signal 1003 to produce a supercoded data signal that is a sum of superbits corresponding to all respective bits of the data signal 1003.

A subcode encoder 1017 receives the supercoded data signal and applies a code $S_i$ selected from a code set S. For purposes of illustration, a code $S_i = \{-1, 1, -1\}$ is selected. The code Si is applied to the supercoded bit packet 1011 to produce a combined subcoded and supercoded ("composite-coded") bit packet 1021 that includes subcoded bits 1023, 1025, 1027, corresponding to respective superbits 1013, 1014, 1015. The encoder 1017 encodes each of the super-coded bits 1013–1015 by relatively delaying portions by a delay time $T_{SC}$ wherein $T_{SC}$ is a subcode chip duration, and changing the phase of the supercoded bits 1013, 1015, to produce the corresponding subcoded bits 1023, 1025, 1027. The encoder 1017 applies the code Si to the supercoded data signal, producing a composite-coded data signal.

The encoders 1007, 1017 apply codes from respective sets R, S to the data signal 1003. If the sets R, S contain $N_R$ and $N_S$ codes, respectively, then $N_R \times N_S$ different encodings are available. For example, if sets R, S each include 5 codes, then 25 encodings are possible. Thus, the number of available encodings increases as the product of $N_R$ and $N_S$ increases so that large numbers of encodings are possible even with small code sets. In addition, the sets R, S can be subsets of a large code set and can include different or identical codes. In this way, a set of N codes can be used to produce $N^2$ different encodings.

FIG. 10 illustrates encoding, with two sets of codes (sets R, S), but additional code sets can be used to further increase the number of available encodings. Subcode bits 1013–1015 can be further encoded with a code set Q having NQ codes, so that the number of available encodings is $N_R \times N_S \times N_Q$. Codes obtained by combining two or more code sets such as the code sets R, S are referred to herein as "composite codes." Composite codes using code sets R, S and code sets R, S, Q are suitable for networks having two and three levels of address encoding/decoding, respectively.

The codes $R_i$, $S_i$ used above are selected as representative examples. More generally, codes include two or more "chips" that specify modulations to be applied to a signal. The chip modulations are applied to a signal at relative times differing by a chip duration $T_C$. Thus, a code and a chip duration specify an encoding of a data signal. A supercode is further specified by an interchip duration. A code R, having a total duration $T_R$, a number of chips $N_R$, and a chip duration $T_{RC}$, and a code S, having a total duration $T_S$, a number of chips $N_S$, and chip duration or interchip delay $T_{SC}$, are effectively orthogonal as decoded if $T_R < T_{SC}$. A composite code can be produced from the code R (a subcode), and from the code S (a supercode). The composite code has a given duration equal to the duration of the supercode and has a number of chips equal to the product of the number of chips of the subcode and the supercode. The chip duration is equal to the subcode chip duration. In the composite code, the subcode is repeated a number of times equal to the number of chips in the supercode.

Code sets and chip durations of supercodes and subcodes (and sub-subcodes) are preferably selected so that a data signal encoded with a particular composite code is decoded only with a matching decoding composite code. Decoding with an unmatched composite code produces only a noise-like background or low amplitude "sidelobes" or "crosstalk."

Given temporal orthogonality between a supercode and the subcode (i.e., low-amplitude cross-correlation and noise-like background), composite code sets of sufficient orthogonality can be generated from a code set with a small number of chips if the codes of the code set are sufficiently orthogonal. A code in a composite code set is generated by using a selected code of the code set as a supercode and another selected code of the code set as a subcode. A composite code set comprises all combinations of supercodes and subcodes. For example, if a code set has M codes each containing $N_m$ chips, then the composite code set contains M×M codes each having $N_m \times N_m$ chips.

Having illustrated and demonstrated the principles of the invention, it should be apparent to those skilled in the art that the embodiments described can be modified in arrangement and detail without departing from such principles. We claim as the invention all that comes within the scope of these claims.

What is claimed is:

1. A communication system, comprising:
    a central station that receives an optical data signal and applies a composite code to the optical signal, the composite code including a first code and a second code, so as to produce a composite-coded optical signal;
    a first-level mux station that receives the composite-coded optical signal and decodes the first code from at least a portion of the optical signal, producing a first-level decoded optical signal;
    a second-level mux station that receives the first-level decoded optical signal and decodes the second code from at least a portion of the optical signal, thereby producing a fully decoded optical signal; and
    a user station that receives the fully decoded optical signal.

2. The communication system of claim 1, wherein the first-level mux station includes a reconfigurable encoder for applying a selected composite code.

3. The communication system of claim 1, wherein the central station applies a composite code selected from a set of composite codes.

4. The communication system of claim 3, wherein composite codes are generated from a set of first-level codes and a set of second-level codes.

5. A method, comprising:
    selecting a first temporal code and a second temporal code for an optical signal to identify a first station and a second station of a plurality of second stations, respectively;
    applying the first and second temporal codes to the optical signal with at least one fiber Bragg grating;
    broadcasting the optical signal to a user station via the first station and the second station;
    stripping the first temporal code from the optical signal at the first station; and
    stripping the second temporal code from the optical signal at the second station after the first station strips off the first temporal code.

6. The method of claim 5, wherein the temporal code is a composite code.

7. A passive optical network, comprising:
    at least one first-level multiplexing station that receives a first optical signal, applies a first-level code to the first optical signal, and transmits a coded first optical signal; and that receives a second optical signal, decodes a first-level code from the second optical signal, and transmits a resulting decoded optical signal; and
    a second-level multiplexing station that receives an optical signal from the at least one first-level multiplexing station and decodes the optical signal to decode a second-level code.

8. The passive optical network of claim 7, wherein the second-level multiplexing station applies a second-level code to an optical signal that is transmitted to the at least one first-level multiplexing station.

9. A communication system, comprising:
    a user station that transmits an optical signal;
    a second-level mux station that receives the optical signal and applies a second-level code to the optical signal, thereby producing an encoded optical signal;
    a first-level mux station that receives the encoded optical signal from the second-level mux station and applies a first-level code to the encoded optical signal producing a composite-coded optical signal; and
    a central station that receives the composite-coded optical signal and decodes the first-level code and the second-level code to identify the user station that transmitted the optical signal.

* * * * *